United States Patent
Goyal et al.

(10) Patent No.: US 12,171,224 B2
(45) Date of Patent: *Dec. 24, 2024

(54) CHOLINE SALT AND AMMONIUM-FREE ADJUVANTS FOR WATER CONDITIONING AND AGRICULTURAL FORMULATIONS

(71) Applicant: SPECIALTY OPERATIONS FRANCE, Lyons (FR)

(72) Inventors: Rajesh Goyal, Gujarat (IN); Thomas Ruch, Voorhees, NJ (US); Krish Shanmuga, Plainsboro, NJ (US); Jean-Christophe Castaing, Sevres (FR); Antoine Vielliard, Paris (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,077

(22) Filed: Aug. 2, 2016

(65) Prior Publication Data
US 2017/0035046 A1 Feb. 9, 2017

Related U.S. Application Data

(60) Provisional application No. 62/202,245, filed on Aug. 7, 2015.

(51) Int. Cl.
*A01N 25/30* (2006.01)
*A01N 25/06* (2006.01)
*A01N 57/20* (2006.01)

(52) U.S. Cl.
CPC ............. *A01N 25/30* (2013.01); *A01N 25/06* (2013.01); *A01N 57/20* (2013.01)

(58) Field of Classification Search
None
See application file for complete search history.

(56) References Cited

U.S. PATENT DOCUMENTS

| | | | | |
|---|---|---|---|---|
| 6,241,795 B1 * | 6/2001 | Svec | ............ | C05F 11/10 71/30 |
| 10,440,948 B2 * | 10/2019 | McKnight | .............. | A01N 25/04 |
| 2011/0054042 A1 | 3/2011 | Wu et al. | | |
| 2012/0103041 A1 * | 5/2012 | Smith | ...................... | C05D 3/00 71/27 |
| 2014/0194289 A1 | 7/2014 | Sclapari et al. | | |
| 2015/0173371 A1 | 6/2015 | Mann et al. | | |
| 2016/0000070 A1 * | 1/2016 | McKnight | .............. | A01N 25/04 514/777 |

FOREIGN PATENT DOCUMENTS

| | | | | |
|---|---|---|---|---|
| CN | 103141479 A | 6/2013 | | |
| EP | 0660999 A1 * | 7/1995 | ............ | A01N 25/10 |
| EP | 0945065 A1 | 9/1999 | | |
| FR | 2615068 A1 | 11/1988 | | |
| JP | 62042907 A * | 2/1987 | | |
| WO | 2005/072722 A2 | 8/2005 | | |
| WO | 2008/106107 A1 | 9/2008 | | |
| WO | 2010/151622 A2 | 12/2010 | | |
| WO | 2011/133482 A1 | 10/2011 | | |
| WO | 2012/113830 A1 | 8/2012 | | |
| WO | 2013189773 A1 | 12/2013 | | |
| WO | 2014/059125 A1 | 4/2014 | | |
| WO | 2015/054561 A1 | 10/2014 | | |
| WO | 2015/100686 A1 | 7/2015 | | |

OTHER PUBLICATIONS

Thelen et al, "Utility of Nuclear Magnetic Resonance for Determining the Molecular Influence of Citric Acid and an Organosilicone Adjuvant on Glyphosate Activity", Weed Science, 43(4), pp. 566-571, Oct. 1995 (Oct. 1995).
Bernards, "AMS—What Is It Doing In My Tank?", Institute of Agriculture and Natural, https://cropwatch.unl.edu/ams-what-it-doing-my-tank, Apr. 20, 2007 (Apr. 20, 2007).
Office Action issued on Dec. 21, 2023 in Canadian Application No. 2994955.

* cited by examiner

*Primary Examiner* — Alton N Pryor
(74) *Attorney, Agent, or Firm* — Vorys, Sater, Seymour and Pease LLP; Anthony P. Venturino; Maryellen Feehery Hank

(57) ABSTRACT

Agricultural compositions comprising a non-pesticide choline salt or a non-ammonium water conditioning agent, optionally, a polysaccharide, optionally, a dispersant or surfactant, and optionally, water, as well as methods of making and applications thereof.

20 Claims, No Drawings

CHOLINE SALT AND AMMONIUM-FREE ADJUVANTS FOR WATER CONDITIONING AND AGRICULTURAL FORMULATIONS

CROSS-REFERENCE TO RELATED APPLICATIONS

This application claims the benefit of U.S. Provisional Patent Application No. 62/202,245 filed Aug. 7, 2015, incorporated herein by reference in its entirety.

FIELD OF THE INVENTION

This invention relates to agricultural formulations containing one or more water conditioning components, in particular, choline salts, optionally one or more polymers, in particular, polysaccharides, and optionally one or more surfactants, which are capable of being solubilized or homogenously dispersed in an aqueous or semi-aqueous pesticide/herbicide composition.

BACKGROUND

Ammonium containing compounds such as ammonium sulphate (AMS), are conventionally used in water conditioning, i.e., to provide a water conditioning benefit to the composition in which they are introduced. Use of AMS has been widely adopted in agricultural practices, especially in "hard water" areas. In these areas, tank mixes contain, as a large component thereof, "hard water" along with pesticides, herbicides (e.g., salts of glyphosate, dicamba) and the like, as well as other components. It is desirable to replace ammonium containing compounds with alternative compounds that are compatible with dicamba and certain of its salts.

SUMMARY OF THE INVENTION

Dry adjuvants in the agricultural market are desired for ease and cost of shipping as compared to liquid adjuvants, as well as other advantages, but dry adjuvants face significant disadvantages. For example, as an advantage, dry adjuvants (which also include adjuvants that contain fertilizers) are capable of containing a high concentration of active ingredients. Further, the ability to incorporate various ingredients into the composition increases the efficacy of the composition. However, many dry adjuvants and fertilizers have a disadvantage in that they must be dissolved before use, which can be hazardous and require substantial mixing and long dissolving times.

In addition, the use of dry fertilizers and adjuvants are problematic because their solubility in water varies with various water qualities throughout the United States. Water temperatures, pH hardness, and mineral content all affect the ease of dispersing or dissolving the fertilizer and adjuvants into the spray mixture, and often times the dissolved dry adjuvants/fertilizers are unevenly mixed and clog lines or cause unevenness in application, destroying crops.

Significant differences in particle sizes between the individual components in a dry product can result in particle separation during shipping and/or storage. This leads to a nonhomogeneous composition which, if applied without remixing, can lead to poor results or cause damage to treated vegetation.

In some agricultural applications, a polymer in the form of dry powder is added to an aqueous medium to impart benefits like drift reduction, deposition, rainfasteness, and the like. This approach can be difficult, for example, as water varies with various water qualities throughout the United States. Water temperatures, pH hardness, and mineral content all affect the ease of dispersing or dissolving the fertilizer and adjuvants into the spray mixture. This unpredictable solubility/dispersion has been a problem for end users applying herbicides to kill weeds. The end users typically prepare herbicidal mixtures using cold water, under varying conditions, and frequently outdoors where solubility problems cannot be satisfactorily resolved. The end users then face the problem of applying a suspension of fertilizer and adjuvant in water with the herbicide. The suspension can plug conveying lines, or cause an uneven application of the fertilizer and herbicide on vegetation, which results in an uneven kill rate and directly exposes an end user preparing the solution to undesirable herbicide and fertilizer contact. Often times, ammonium containing compounds such as ammonium sulphate (AMS), diammonium phosphate (DAP), and urea ammonium nitrate (UAN) can be used to control polysaccharide hydration, as a hydration inhibitor.

Further, in the agricultural industry, ammonium containing compounds such as ammonium sulphate (AMS), diammonium phosphate (DAP), and urea ammonium nitrate (UAN), among others, are conventionally used in water conditioning, i.e., to provide a water conditioning benefit to the composition in which they are introduced. Use of AMS, DAP and UAN, among others, have been widely adopted in agricultural practices, especially in "hard water" areas.

However, to combat the rise of glyphosate-resistant weeds, the trend in the agricultural industry has shifted away from utilizing only glyphosate and, instead, to other herbicides or a combination of glyphosate with other herbicides. Other herbicides, for example, dicamba and its salts, can be utilized. However, certain salts of dicamba acid such as BAPMA (N,N-Bis-(aminopropyl) methylamine) are known to have volatility issues with ammonium containing compounds used for water conditioning. As such, it is desirable to replace these ammonium containing compounds with alternative compounds that are compatible with dicamba and its salts. In one embodiment, the compositions as described herein are free of added ammonium containing compounds or are prepared in the absence of ammonium containing compounds. In another embodiment, the composition as described herein are substantially free of ammonium containing compounds, meaning no ammonium containing compounds have been added to the composition.

There is also a continuing interest in providing dry adjuvant compositions in a convenient form that exhibits good handling properties and good storage stability.

In a first aspect, described herein are agricultural compositions comprising:
a non-pesticide choline salt;
at least one pesticide; and
optionally, water.

In a second aspect, described herein are agricultural compositions comprising:
A non-pesticide water conditioning component comprising at least one of the following: choline bicarbonate, choline carbonate, choline sulfate, choline citrate, choline acrylates, choline carboxylates, choline phosphonates, tricholine citrate, tricholine phosphate, choline dihydrogen citrate, or choline bitartrate (In some embodiments, these are also termed "hydration inhibitors");
at least one pesticide; and
optionally, water.

In a third aspect, described herein are agricultural compositions comprising:

a water conditioning component comprising at least one of either:
(i) a non-pesticide choline salt, or
(ii) choline bicarbonate, choline carbonate, choline sulfate, choline citrate, choline acrylates, choline carboxylates, choline phosphonates, tricholine citrate, tricholine phosphate, choline dihydrogen citrate, or choline bitartrate; and
a drift reduction agent comprising at least one polysaccharide or at least one derivatized polysaccharide or a combination thereof;
optionally, a dispersant or surfactant; and
optionally, water.

In a fourth aspect, described herein are agricultural compositions comprising:
a water conditioning component comprising at least one of either:
(i) a non-pesticide choline salt, or
(ii) choline bicarbonate, choline carbonate, choline sulfate, choline citrate, choline acrylates, choline carboxylates, choline phosphonates, tricholine citrate, tricholine phosphate, choline dihydrogen citrate, or choline bitartrate;
a surfactant; and
optionally, a dispersant.

In one embodiment, the adjuvant further comprises a water-soluble nitrogen-containing fertilizer. In some embodiments, the water conditioning component is interchangeable with "hydration inhibitor" or "hydration inhibitor component".

In another embodiment, the at least one derivatized polysaccharide is hydroxy propyl guar or carboxymethylhydroxypropyl guar. In another embodiment, the derivatized polysaccharide is hydroxypropyl guar, carboxymethyl guar, hydroxypropyl trimethylammonium guar, hydroxypropyl lauryldimethylammonium guar or hydroxypropyl stearyldimethylammonium guar. In one typical embodiment, the derivatized polysaccharide is chosen from cationic hydroxylpropyl (HP) guar or cationic guar such as trimethylammonium guar. In some embodiments, the adjuvant composition comprises additional component, for example and antifoam agent.

In another embodiment, water conditioning component (or hydration inhibitor) is present in amount from about 5 wt % to 90 wt %, typically from about 10 wt % to about 50 wt %. In some embodiments, the hydration inhibitor or water conditioning component is present in amount from about 20 wt % to about 50 wt %, typically about 25 wt % to about 45 wt %. In another embodiment, the composition is free or substantially free of ammonium-containing compounds. In another embodiment, the composition is substantially free of ammonium-containing compounds, meaning ammonium-containing compounds are present in less than about 1% by weight of total composition. In another embodiment, "substantially free of ammonium-containing compounds" means that ammonium-containing compounds are present in less than about 0.5% or 0.2% or 0.1% by weight of total composition.

In some embodiments, the water conditioning component comprises at least one of: a non-pesticide choline salt, choline carbonate, choline sulfate, choline citrate, choline acrylates, choline carboxylates, choline phosphonates, tricholine citrate, tricholine phosphate, choline dihydrogen citrate or choline bitartrate. In another embodiment, the water conditioning component can be any combination of a non-pesticide choline salt, choline carbonate, choline sulfate, choline citrate, choline acrylates, choline carboxylates, choline phosphonates, tricholine citrate, tricholine phosphate, choline dihydrogen citrate or choline bitartrate. It is understood that non-pesticide choline salts exclude choline salts having pesticide activity such as 2,4-D choline salt, aminopyralid choline salt, triclopyr choline salt, and the like, or any mixture thereof.

In another aspect, described herein are methods for preparing a pesticide composition comprising the steps of:
contacting an adjuvant composition comprising, by weight of composition:
i. about to 5 wt % about 90 wt % of at least one of the following: a non-pesticide choline salt, choline carbonate, choline sulfate, choline citrate, choline acrylates, choline carboxylates, choline phosphonates, tricholine citrate, tricholine phosphate, choline dihydrogen citrate or choline bitartrate.
ii. about 0.01 wt % to about 15 wt % of a drift reduction agent comprising at least one polysaccharide or at least one derivatized polysaccharide or a combination thereof;
iii. about 0.01 wt % to about 50 wt % of a surfactant or dispersant; and
iv. optionally, water.
with a pesticide to form a pesticide formulation or composition, wherein the pesticide composition is free or substantially free of ammonium-containing compounds. The pesticide composition, in one embodiment, is a herbicide composition containing at least one herbicide. In another embodiment, the herbicide composition is a mixture of dicamba or salt thereof mixed with a second herbicide, typically, a glyphosate salt.

In another embodiment, the concentrated adjuvant composition can further comprise a pesticide active ingredient, wherein the composition can enhance delivery of the pesticide active ingredient from the liquid medium to a target substrate.

In some embodiments, the pesticide formulation comprising the adjuvant composition can be suspended in a liquid medium. The pesticide formulation can be in the form of a concentrated pesticide formulation or end-use pesticide formulation. The liquid medium can be an aqueous liquid medium, in one embodiment. In another embodiment, the liquid medium is water. In another embodiment, the liquid medium is water and a water miscible organic liquid. In yet another embodiment, the liquid medium is an aqueous liquid medium that comprises water and a water immiscible organic liquid. The resulting composition can be in the form of an emulsion, a microemulsion, or a suspoemulsion.

In one embodiment, the polysaccharide is selected from non-derivatized guar, derivatized guar, and mixtures thereof. In one embodiment, the dispersing agent is selected from fumed silicas, inorganic colloidal or colloid-forming particles, rheology modifier polymers, water soluble polysaccharide polymers other than the non-derivatized or derivatized guar polymer, and mixtures thereof.

In a further aspect, described herein are methods for making and preparing liquid agricultural adjuvant compositions, as well as methods for preparing concentrated liquid pesticide composition, and liquid end-use pesticide compositions. In one embodiment, the method for preparing the liquid end-use pesticide composition comprises mixing the composition as described herein with an agricultural pesticide compound, optionally other agricultural adjuvants, and water to form a pesticide composition for spray application to target pests. In one embodiment, the composition is free or substantially free of ammonium-containing compounds.

In a further aspect, described herein are methods for making and preparing dry agricultural adjuvant compositions, as well as methods for preparing dry pesticide composition. In one embodiment, the method for preparing the pesticide composition comprises mixing the composition as described herein with an agricultural pesticide compound, optionally other agricultural adjuvants, in the absence of added water to form a pesticide composition to be used for spray application to target pests. In one embodiment, the composition is free or substantially free of ammonium-containing compounds.

DETAILED DESCRIPTION OF INVENTION AND PREFERRED EMBODIMENTS

As used herein, the term "alkyl" means a saturated straight chain, branched chain or cyclic hydrocarbon radical, such as for example, methyl, ethyl, n-propyl, iso-propyl, n-butyl, sec-butyl, t-butyl, pentyl, n-hexyl, cyclohexyl, which, in the case of cyclic alkyl groups, may be further substituted on one or more carbon atoms of the ring with a straight chain or branched alkyl group and wherein any two of such substituents may be fused to form a polyalkylene group that bridges the two ring carbon atoms to which they are attached.

As used herein, the term "alkyldienyl" means a saturated linear or branched diradical, such as for example,

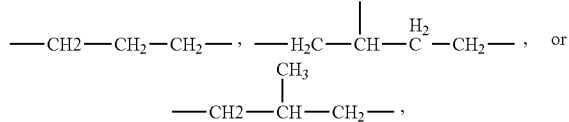

and the term "alkyltrienyl" means a saturated linear or branched triradical such as for example,

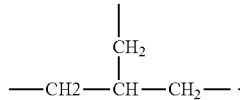

As used herein, the term "alkoxyl" means an oxy group substituted with an alkyl group, such as, for example, methoxyl, ethoxyl, and propoxyl.

As used herein, the term "hydroxyalkyl" means a saturated straight chain or branched chain hydrocarbon radical substituted one or more carbon atoms with a hydroxyl group, such as for example, hydroxymethyl, hydroxyethyl, hydroxypropyl.

As used herein, the term "alkenyl" means an unsaturated straight chain, branched chain, or cyclic hydrocarbon radical that contains one or more carbon-carbon double bonds, such as, for example, ethenyl, 1-propenyl, and 2-propenyl, cyclohexenyl, which, in the case of cyclic alkenyl groups, may be further substituted on one or more carbon atoms of the ring with a straight chain or branched alkyl group and wherein any two of such substituents may be fused to form a polyalkylene group that bridges the two ring carbon atoms to which they are attached.

As used herein, the term "aryl" or "aromatic" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl, and tristyrylphenyl.

As used herein, the term "alkenyldienyl" means an unsaturated linear or branched diradical, such as, for example,

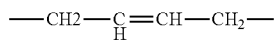

and the term "alkenyltrienyl" means an unsaturated linear or branched triradical, such as for example,

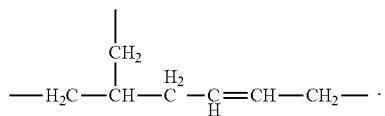

As used herein, the term "aralkyl" means an alkyl group substituted with one or more aryl groups, such as, for example, phenylmethyl, phenylethyl, and triphenylmethyl.

As used herein, the term "alkylaromatic" means an aromatic group substituted with one or more linear, branched or cyclic alkyl groups, such as, for example, methylphenyl, and ethylphenyl.

As used herein, the terminology "($C_m$-$C_n$)" in reference to an organic group, wherein m and n are each integers, indicates that the group may contain from m carbon atoms to n carbon atoms per group.

As used herein, the term "agronomically acceptable salts" refers to salts prepared from agronomically acceptable non-toxic bases or acids including inorganic or organic bases and inorganic or organic acids. Typical agronomically acceptable salts the compound referred to herein comprise an anion derived from the compound, for example, by deprotonation of a hydroxy or hydroxyalkyl substituent, and one or more positively charged counterions. Suitable positively charged counterions include inorganic cations and organic cations, such as for example, sodium cations, potassium cations, calcium cations, magnesium cations, isopropylamine cations, ammonium cations, and tetraalkylammonium cations.

As used herein, the terminology "end use pesticide composition" means an aqueous pesticide composition that contains pesticide in amount effective to control a target pest, such as, for example, a target plant, fungus, bacterium, or insect, when the end use pesticide composition is applied, typically in the form of an spray, to the pest and/or to the environment of the pest at a given application rate and the terminology "concentrated pesticide composition" means a composition that contains a relatively high concentration of pesticide that is suitable to be diluted with water to form an end use pesticide composition. In some embodiment, the pesticide composition is a herbicide composition, as will be apparent when used in context (e.g., when used in connection with glyphosate and/or dicamba, the pesticide compositions is understood to mean a herbicide composition).

As used herein, the terminology "effective amount" in reference to the relative amount of a pesticide in a pesticide composition means the relative amount of pesticide that is effective to control a target pest, for example, a target plant, fungus, bacterium, or insect, when the pesticide composition is applied to the pest and/or to the environment of the pest at a given application rate and the terminology "herbicidally effective amount" in reference to the relative amount of herbicide in an herbicidal composition means the relative amount that is effective to control growth of a target plant when the herbicidal composition is spray applied to the target plant and/or to the environment of the plant at a given application rate.

As used herein, the term "dry" in reference to a composition means that there is no water added to the composition. It is understood that while no water is added to the composition, moisture content in the composition (due to the surrounding atmosphere and conditions) can, in some embodiment, reach an amount of up to 0.5 wt % by weight of composition. In other embodiments, the moisture content can reach an amount of up to 0.1 wt % by weight of composition, while in other embodiments, the moisture content can reach an amount of up to 0.8 wt % by weight of composition. In further embodiments, the moisture content can reach an amount of up to 1 wt % by weight of composition, while in other embodiments, the moisture content can reach an amount of up to 2 wt % by weight of composition, and finally in other embodiments, the moisture content can reach an amount of up to 3 wt % by weight of composition.

As used herein, the term "drift" refers to off-target movement of droplets of a pesticide composition that is applied to a target pest or environment for the pest. Spray applied compositions typically exhibit decreasing tendency to drift with decreasing relative amount, typically expressed as a volume percentage of total spray applied droplet volume, of small size spray droplets, that is, spray droplets having a droplet size below a given value, typically, a droplet size of less than 150 micrometers ("μm"). Spray drift of pesticides can have undesirable consequences, such as for example, unintended contact of phytotoxic pesticides with non-pest plants, such as crops or ornamental plants, with damage to such non-pest plants.

As used herein, the terminology "an amount effective to reduce spray drift" in reference to the control agent of the present invention means an amount of such drift control agent that, when added to a given aqueous pesticide composition and the combined aqueous pesticide composition and drift control agent is spray applied, is effective to reduce spray drift of the spray applied composition compared to an analogous spray applied pesticide composition that lacks the drift control agent that is spray applied under the same conditions. Typically, the ability of a given amount of drift control agent to reduce spray drift of a spray applied composition is evaluated by spray applying, under the same spray conditions, a pesticide composition that contains the given amount of drift control agent and an analogous pesticide composition that lacks the drift control agent and then comparing the relative amount of small size spray droplets exhibited by spray applied compositions, with a reduction in the amount of small size spray droplets being indicative of the ability to reduce spray drift of the spray applied composition.

As used herein, "liquid medium" means a medium that is in the liquid phase at a temperature of 25° C. and a pressure of one atmosphere. The liquid medium may be a non-aqueous liquid medium or an aqueous liquid medium.

In one embodiment, the liquid medium is a non-aqueous liquid medium. As used herein, the terminology "non-aqueous medium" means a single phase liquid medium that contains no more than trace amounts of water, typically, based on 100 parts by weight ("pbw") of the non-aqueous medium, no more than 0.1 pbw water. Suitable non-aqueous liquid media include organic liquids, including non-polar organic liquids, such as benzene, chloroform, and diethyl ether, polar aprotic organic liquids, such as dichloromethane, ethyl acetate, acetone, and tetrahydrofuran, and polar protic organic liquids, such as ($C_1$-$C_3$)alkanols and ($C_1$-$C_3$) polyols, such as methanol, ethanol, and propanol, glycerol, ethylene glycol, propylene glycol, diethylene glycol, poly (ethylene glycol)s, ethylene glycol monobutyl ether, dipropylene glycol methyl ether, and ethylene glycol phenyl ether, as well as mixtures of such liquids. In one embodiment, the non-aqueous medium comprises an organic liquid that is not miscible with water (a "water immiscible organic liquid"), such as, for example, fatty acid esters and alkylated fatty acid esters. Suitable fatty acid esters include alkyl or hydroxyalkyl esters of ($C_{12}$-$C_{22}$)carboxylic acids, such as butyl myristate, cetyl palmitate, decyloleate, glyceryl laurate, glyceryl ricinoleate, glyceryl stearate, glyceryl isostearate, hexyl laurate, isobutyl palmitate, isocetyl stearate, isopropyl isostearate, isopropyl laurate, isopropyl linoleate, isopropyl myristate, isopropyl palmitate, isopropyl stearate, propylene glycol monolaurate, propylene glycol ricinoleate, propylene glycol stearate, and propylene glycol isostearate, and mixtures thereof, including ($C_1$-$C_3$)alkylated esters of ($C_{12}$-$C_{22}$)carboxylic acids, such as methylated rapeseed oil and methylated soybean oil.

In one embodiment, the liquid medium is an aqueous liquid medium. As used herein, the terminology "aqueous medium" means a single phase liquid medium that contains more than a trace amount of water, typically, based on 100 pbw of the aqueous medium, more than 0.1 pbw water. Suitable aqueous media more typically comprise, based on 100 pbw of the aqueous medium, greater than about 5 pbw water, even more typically greater than 10 pbw water. In one embodiment, the aqueous emulsion comprises, based on 100 pbw of the aqueous medium, greater than 40 pbw water, more typically, greater than 50 pbw water. The aqueous medium may, optionally, further comprise water soluble or water miscible components dissolved in the aqueous medium. The terminology "water miscible" as used herein means miscible in all proportions with water. Suitable water miscible organic liquids include, for example, ($C_1$-$C_3$)alcohols, such as methanol, ethanol, and propanol, and ($C_1$-$C_3$) polyols, such as glycerol, ethylene glycol, and propylene glycol. The composition of the present invention may, optionally, further comprise one or more water insoluble or water immiscible components, such as a water immiscible organic liquid, wherein the combined aqueous medium and water insoluble or water immiscible components form a micro emulsion, or a multi-phase system such as, for example, an emulsion, a suspension or a suspo-emulsion, in which the aqueous medium is in the form of a discontinuous phase dispersed in a continuous phase of the water insoluble or water immiscible component, or, more typically, the water insoluble or water immiscible component is in the form of a discontinuous phase dispersed in a continuous phase of the aqueous medium.

Choline, (p-hydroxyethyl) trimethylammonium hydroxide, can be utilized in the form of one of its salts, such as choline chloride.

As described herein, agricultural formulations have been developed which can replace ammonium sulfate as an inorganic carrier or water conditioning component with one or a combination of the following: a non-pesticide choline salt, choline carbonate, choline sulfate, choline citrate, choline acrylates, choline carboxylates, choline phosphonates, tricholine citrate, tricholine phosphate, choline dihydrogen citrate or choline bitartrate. In one embodiment, these are characterized as replacement water conditioning components.

Suitable choline salts may be prepared with both organic and inorganic acids. Examples of inorganic acids are hydrochloric acid, nitric acid, phosphoric acid, sulfuric acid, and the like; examples of organic acids which may be used are acetic, propionic, butyric, stearic, and the like; dibasic acids such as oxalic, malonic, succinic, tartaric, citric, gluconic, and the like, as well as amino acids such as glycine, serine, alanine, glutamic, folic, and the like may be used. In general, any type of organicacid may be used if it has sufficient acidity to form a stable choline salt. One or more choline salts, in one embodiment, include but are not limited to choline folate, choline ascorbate, choline salicylate, choline carbonate, choline sulfate, choline citrate, choline acrylates, choline carboxylates, choline phosphonates, tricholine citrate, tricholine phosphate, choline dihydrogen citrate, or choline bitartrate.

One or more non-pesticide choline salts, in one embodiment, include but are not limited to choline folate, choline ascorbate, choline salicylate, choline carbonate, choline sulfate, choline citrate, choline acrylates, choline carboxylates, choline phosphonates, tricholine citrate, tricholine phosphate, choline dihydrogen citrate, or choline bitartrate. In another embodiment, one or more non-pesticide choline salts include but are not limited to, choline carbonate, choline sulfate, choline citrate, choline acrylates, choline carboxylates, choline phosphonates, tricholine citrate, tricholine phosphate, choline dihydrogen citrate, or choline bitartrate. In another embodiment, one or more non-pesticide choline salts include but are not limited to choline bicarbonate and/or choline citrate.

In one embodiment, the agricultural composition comprises:

a non-pesticide choline salt;

at least one pesticide; and optionally, water.

In some embodiment, water is present. In some embodiments, the amount of non-pesticide choline salt is at least 0.5%, at least 1%, at least 1.5%, at least 2%, at least 2.5, at least 3%, at least 3.5%, at least 4%, at least 4.5%, at least 5%, at least 5.5%, at least 6%, at least 6.5%, at least 7%, at least 8%, at least 9%, or at least 10% by weight.

In other embodiments, the amount of water conditioning component is at least 10%, at least 15%, at least 20%, at least 25%, at least 30%, at least 35%, at least 40%, at least 50%, at least 55%, at least 60%, at least 65%, at least 70%, at least 75%, at least 80%, at least 85%, at least 90% by weight, at least 95%, at least 97%, or at least 98% by weight.

In some embodiments, the amount of pesticide is at least 0.005%, at least 0.01%, at least 0.02%, at least 0.03%, at least 0.04%, at least 0.05%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, or at least 1% by weight.

In one embodiment, agricultural composition comprise: (A) A non-pesticide water conditioning component comprising at least one of the following: a non-pesticide choline salt, choline carbonate, choline sulfate, choline citrate, choline acrylates, choline carboxylates, choline phosphonates, tricholine citrate, tricholine phosphate, choline dihydrogen citrate or choline bitartrate; (B) at least one pesticide; and (C) optionally, water. In some embodiments, water is present.

Also described are agricultural compositions comprising, by weight of composition:

(A) a water conditioning component comprising at least one of either:
  (i) a non-pesticide choline salt, or
  (ii) choline bicarbonate, choline carbonate, choline sulfate, choline citrate, choline acrylates, choline carboxylates, choline phosphonates, tricholine citrate, tricholine phosphate, choline dihydrogen citrate or choline bitartrate;

(B) a drift reduction agent comprising at least one polysaccharide or at least one derivatized polysaccharide or a combination thereof;

(C) optionally, a surfactant or a disperant; and (D) optionally, water.

In some embodiments, the surfactant is present. In other embodiments, water is present. In yet other embodiments, both water and the surfactant are present.

In another embodiment, agricultural compositions comprise:

(A) a water conditioning component comprising at least one of either:
  (i) a non-pesticide choline salt, or
  (ii) choline bicarbonate, choline carbonate, choline sulfate, choline citrate, choline acrylates, choline carboxylates, choline phosphonates, tricholine citrate, tricholine phosphate, choline dihydrogen citrate or choline bitartrate;

(B) a surfactant; and (C) optionally, a dispersant.

In some embodiments, the water conditioning component comprises, by weight of composition, from about to 5 wt % to about 90 wt %. In some embodiments, the drift reduction agent comprises, by weight of composition, from about 0.01 wt % to about 15 wt %. In some embodiments, the surfactant comprises, by weight of composition, from about 0.01 wt % to about 50 wt %.

In some embodiments, the amount of water conditioning component is at least 0.5%, at least 1%, at least 1.5%, at least 2%, at least 2.5, at least 3%, at least 3.5%, at least 4%, at least 4.5%, at least 5%, at least 5.5%, at least 6%, at least 6.5%, at least 7% by weight, at least 8%, at least 9%, or at least 10% by weight. In other embodiments, the amount of water conditioning component is at least 10%, at least 15%, at least 20%, at least 25%, at least 30%, at least 35%, at least 40%, at least 50%, at least 55%, at least 60%, at least 65%, at least 70%, at least 75%, at least 80%, at least 85%, at least 90% by weight, at least 95%, at least 97%, or at least 98% by weight.

In one embodiment, these water conditioning components are combined with a polysaccharide for drift control benefit. In one embodiment, the formulation also contains a surfactant or dispersant for the guar, a pH increaser to prevent quick guar hydration, and has chelating capabilities to condition water.

In one embodiment, the adjuvant compositions as described herein can contain a suspending the suspending agent is selected from silica, more typically fumed silica, inorganic colloidal or colloid-forming particles, more typically clays, rheology modifier polymers, and mixtures thereof. In one embodiment, wherein the liquid medium is an aqueous medium, the suspending agent comprises a polysaccharide polymer that differs from the polysaccharide and that is more readily hydrolyzed than the polysaccharide. For example, xanthan gum may be dissolved in an aqueous medium and used as a suspending agent to suspend incompletely hydrolyzed guar particles in the aqueous medium.

The adjuvant compositions and/or pesticide compositions can also comprise in other components such as surfactants, water soluble non-surfactant salts, water dispersible organic solvents, and mixtures thereof. The terminology "non-surfactant salts" as used herein means salts that are not anionic, cationic, zwitterionic or amphoteric surfactants and includes active ingredients, such as a pesticidal active ingredient or a pharmaceutical active ingredient, that are salts and whose primary activity is other than modification of interfacial surface tension. The terminology "water dispersible organic solvents" includes water miscible organic liquids and water immiscible organic liquids that may be dispersed in water, such as for example, in the form of an emulsion of the water immiscible organic liquid in water.

It will be appreciated that the water conditioning component(s) of the present invention may each perform more than one function. For example, the water conditioning component can function as a hydration inhibitor component in the composition of the present invention may also perform a desired function, for example, biological activity, in an end use application, such as a pharmaceutical or pesticide composition. In one embodiment, the hydration inhibitor component is selected from any one or more of the following: choline citrate, poly (acrylates/carboxylates), phosphonates, tricholine citrate, tricholine phosphate, choline dihydrogen citrate, or choline bitartrate.

In one embodiment, the composition of the present invention comprises, based on 100 pbw of the composition, of from greater than 0 pbw, more typically from about 1 pbw, even more typically from about 2 pbw, and still more typically from greater than 2.5 pbw, in another embodiment greater than 5 pbw, in another embodiment greater than 7.5 pbw, in another embodiment greater than 10 pbw, in another embodiment greater than 12.5 pbw, in another embodiment greater than 15 pbw, of the polysaccharide.

In another embodiment, the polysaccharide is present in an amount having a lower limit, based on 100 pbw of composition, of 1 pbw, or in another embodiment of 1.2 pbw, or in another embodiment, 1.4 pbw, or in another embodiment, 1.6 pbw, or in another embodiment, 1.8 pbw, or in yet another further embodiment, 2 pbw, or in another embodiment, 2.4 pbw, or in a further embodiment, 3 pbw, or in another embodiment, 3.5 pbw, or in another embodiment, 3.8 pbw, or in another embodiment, 4 pbw, or in another embodiment, 4.5 pbw, or one embodiment, 5 pbw, or in another embodiment, 7 pbw, or in a further embodiment, 8 pbw, or in another embodiment, 10 pbw, or in yet another embodiment, 12 pbw, or in another embodiment, 16 pbw, or in another embodiment, 20 pbw. In one particular embodiment, the polysaccharide is present in an amount having a lower limit, based on 100 pbw of aqueous solution or composition, of 1.8 pbw. In one particular embodiment, the polysaccharide is present in an amount having a lower limit, based on 100 pbw of aqueous solution or composition, of 3.8 pbw. In one particular embodiment, the polysaccharide is present in an amount having a lower limit, based on 100 pbw of aqueous solution or composition, of 4 pbw. In one particular embodiment, the polysaccharide is present in an amount having a lower limit, based on 100 pbw of aqueous solution or composition, of 2 pbw.

In yet another embodiment, the polysaccharide is present in an amount having an upper limit, based on 100 pbw of aqueous solution or composition, of 50 pbw, or in another embodiment of 46 pbw, or in another embodiment, 45 pbw, or in another embodiment, 43 pbw, or in another embodiment, 40 pbw, or in yet another further embodiment, 39 pbw, or in another embodiment, 37 pbw, or in a further embodiment, 35 pbw, or in another embodiment, 30 pbw, or in another embodiment, 25 pbw, or in another embodiment, 20 pbw, or in another embodiment, 18 pbw, or one embodiment, 16 pbw, or in another embodiment, 14 pbw, or in a further embodiment, 12 pbw, or in another embodiment, 10 pbw. In one particular embodiment, the polysaccharide is present in an amount having an upper limit, based on 100 pbw of aqueous solution or composition, of 50 pbw. In one particular embodiment, the polysaccharide is present in an amount having an upper limit, based on 100 pbw of aqueous solution or composition, of 24pbw.

Polysaccharides typically have a large number of hydrophilic, typically, hydroxyl, substituent groups, per molecule, more typically one or more hydroxyl group per monomeric unit of the polysaccharide polymer.

In one embodiment, the polysaccharide has a weight average molecular weight of up to about 10,000,000 grams per mole (g/mol) more typically of up to about 5,000,000 grams per mole, more typically from about 100,000 to about 4,000,000 g/mol, even more typically from about 500,000 to about 3,000,000 g/mol. The weight average molecular weight of a polysaccharide polymer may be determined by known methods, such as by gel permeation chromatography with light scattering or refractive index detection. As generally used herein, i.e., in the absence of an explicit limitation such as "derivatized" or "non-derivatized", the term "guar polymer" refers collectively to non-derivatized polysaccharide polymers and derivatized polysaccharide polymers.

In one embodiment, wherein the polysaccharide is a depolymerized guar having a molecular weight of less than about 100,000 g/mol.

Suitable water soluble polysaccharide polymers are include, for example, galactomannans such as guars, including guar derivatives, xanthans, polyfructoses such as levan, starches, including starch derivatives, such as amylopectin, and cellulose, including cellulose derivatives, such as methylcellulose, ethylcellulose, carboxymethylcellulose, hydroxyethylcellulose, cellulose acetate, cellulose acetate butyrate, and cellulose acetate propionate.

Galactomannans are polysaccharides consisting mainly of the monosaccharides mannose and galactose. The mannose-elements form a chain consisting of many hundreds of (1,4)-β-D-mannopyranosyl-residues, with 1,6 linked α-D-galactopyranosyl-residues at varying distances, dependent on the plant of origin. Naturally occurring galactomannans are available from numerous sources, including guar gum, guar splits, locust bean gum and tara gum. Additionally, galactomannans may also be obtained by classical synthetic routes or may be obtained by chemical modification of naturally occurring galactomannans.

Guar gum refers to the mucilage found in the seed of the leguminous plant *Cyamopsis tetragonolobus*. The water soluble fraction (85%) is called "guaran," which consists of linear chains of (1,4)-β-D mannopyranosyl units—with α-D-galactopyranosyl units attached by (1,6) linkages. The ratio of D-galactose to D-mannose in guaran is about 1:2. Guar gum typically has a weight average molecular weight of between 2,000,000 and 5,000,000 g/mol. Guars having a reduced molecular weight, such as for example, from about 50,000 to about 2,000,000 g/mol are also known.

Guar seeds are composed of a pair of tough, non-brittle endosperm sections, hereafter referred to as "guar splits," between which is sandwiched the brittle embryo (germ). After dehulling, the seeds are split, the germ (43-47% of the seed) is removed by screening, and the splits are ground. The ground splits are reported to contain about 78-82% galactomannan polysaccharide and minor amounts of some proteinaceous material, inorganic non-surfactant salts, water-insoluble gum, and cell membranes, as well as some residual seedcoat and embryo.

Locust bean gum or carob bean gum is the refined endosperm of the seed of the carob tree, *Ceratonia siliqua*. The ratio of galactose to mannose for this type of gum is about 1:4. Locust bean gum is commercially available.

Tara gum is derived from the refined seed gum of the tara tree. The ratio of galactose to mannose is about 1:3. Tara gum is commercially available.

Other galactomannans of interest are the modified galactomannans, including derivatized guar polymers, such as carboxymethyl guar, carboxymethylhydroxypropyl guar, cationic hydroxpropyl guar, hydroxyalkyl guar, including hydroxyethyl guar, hydroxypropyl guar, hydroxybutyl guar and higher hydroxylalkyl guars, carboxylalkyl guars, including carboxymethyl guar, carboxylpropyl guar, carboxybutyl guar, and higher carboxyalkyl guars, the hydroxyethylated, hydroxypropylated and carboxymethylated derivative of guaran, the hydroxethylated and carboxymethylated derivatives of carubin, and the hydroxypropylated and carboxymethylated derivatives of cassia-gum. In one embodiment, the derivatized guar is cationic hydroxypropyl guar or cationic guar, for example, hydroxypropyl trimethylammonium guar, trimethylammonium guar, respectively.

Xanthans of interest are xanthan gum and xanthan gel. Xanthan gum is a polysaccharide gum produced by *Xathomonas campestris* and contains D-glucose, D-mannose, D-glucuronic acid as the main hexose units, also contains pyruvate acid, and is partially acetylated.

Levan is a polyfructose comprising 5-membered rings linked through β-2,6 bonds, with branching through β-2,1 bonds. Levan exhibits a glass transition temperature of 138° C. and is available in particulate form. At a molecular weight of 1-2 million, the diameter of the densely-packed spherulitic particles is about 85 nm.

Modified celluloses are celluloses containing at least one functional group, such as a hydroxy group, hydroxycarboxyl group, or hydroxyalkyl group, such as for example, hydroxymethyl cellulose, hydroxyethyl celluloses, hydroxypropyl celluloses or hydroxybutyl celluloses.

Processes for making derivatives of guar gum splits are generally known. Typically, guar splits are reacted with one or more derivatizing agents under appropriate reaction conditions to produce a guar polysaccharide having the desired substituent groups. Suitable derivatizing reagents are commercially available and typically contain a reactive functional group, such as an epoxy group, a chlorohydrin group, or an ethylenically unsaturated group, and at least one other substituent group, such as a cationic, nonionic or anionic substituent group, or a precursor of such a substituent group per molecule, wherein substituent group may be linked to the reactive functional group of the derivatizing agent by bivalent linking group, such as an alkylene or oxyalkylene group. Suitable cationic substituent groups include primary, secondary, or tertiary amino groups or quaternary ammonium, sulfonium, or phosphinium groups. Suitable nonionic substituent groups include hydroxyalkyl groups, such as hydroxypropyl groups. Suitable anionic groups include carboxyalkyl groups, such as carboxymethyl groups. The cationic, nonionic and/or anionic substituent groups may be introduced to the guar polysaccharide chains via a series of reactions or by simultaneous reactions with the respective appropriate derivatizing agents.

The guar may be treated with a crosslinking agent, such for example, borax (sodium tetra borate) is commonly used as a processing aid in the reaction step of the water-splits process to partially crosslink the surface of the guar splits and thereby reduces the amount of water absorbed by the guar splits during processing. Other crosslinkers, such as, for example, glyoxal or titanate compounds, are known.

In one embodiment, the polysaccharide component of the composition of the present invention is a non-derivatized galactomannan polysaccharide, more typically a non-derivatized guar gum.

In one embodiment, the polysaccharide is a derivatized galactomannan polysaccharide that is substituted at one or more sites of the polysaccharide with a substituent group that is independently selected for each site from the group consisting of cationic substituent groups, nonionic substituent groups, and anionic substituent groups.

In one embodiment, the polysaccharide component of the composition of the present invention is derivatized galactomannan polysaccharide, more typically a derivatized guar. Suitable derivatized guars include, for example, hydroxypropyl trimethylammonium guar, trimethylammonium guar, hydroxypropyl lauryldimethylammonium guar, hydroxypropyl stearyldimethylammonium guar, hydroxypropyl guar, carboxymethyl guar, guar with hydroxypropyl groups and hydroxypropyl trimethylammonium groups, guar with carboxymethyl hydroxypropyl groups and mixtures thereof. In some embodiments, the derivatized guar is cationic hydroxypropyl guar or cationic guar.

The amount of derivatizing groups in a derivatized polysaccharide polymer may be characterized by the degree of substitution of the derivatized polysaccharide polymer or the molar substitution of the derivatized polysaccharide polymer.

As used herein, the terminology "degree of substitution" in reference to a given type of derivatizing group and a given polysaccharide polymer means the number of the average number of such derivatizing groups attached to each monomeric unit of the polysaccharide polymer. In one embodiment, the derivatized galactomannan polysaccharide exhibits a total degree of substitution ("$DS_T$") of from about 0.001 to about 3.0, wherein:

$DS_T$ is the sum of the DS for cationic substituent groups ("$DS_{cationic}$"), the DS for nonionic substituent groups ("$DS_{nonionic}$") and the DS for anionic substituent groups ("$DS_{anionic}$"), $DS_{cationic}$ is from 0 to about 3, more typically from about 0.001 to about 2.0, and even more typically from about 0.001 to about 1.0, $DS_{nonionic}$ is from 0 to 3.0, more typically from about 0.001 to about 2.5, and even more typically from about 0.001 to about 1.0, and $DS_{anionic}$ is from 0 to 3.0, more typically from about 0.001 to about 2.0.

As used herein, the term "molar substitution" or "ms" refers to the number of moles of derivatizing groups per moles of monosaccharide units of the guar. The molar substitution can be determined by the Zeisel-GC method. The molar substitution utilized by the present invention is typically in the range of from about 0.001 to about 3.

In one embodiment, the polysaccharide polymer is in the form of particles. In one embodiment, the particles of polysaccharide polymer have an initial, that is, determined for dry particles prior to suspension in the aqueous medium, average particle size of about 5 to 200 μm, more typically about 20 to 200 μm as measured by light scattering, and exhibit a particle size in the aqueous medium of greater than or equal to the initial particle size, that is greater than or equal to 5 μm, more typically greater or equal to than 20 μm, with any increase from the initial particle size being due to swelling brought about by partial hydration of the polysaccharide polymer in the aqueous medium.

In one embodiment, the compositions described herein further comprise at least one suspending agent. In one embodiment, the suspending agent component of the composition of the present invention comprises a fumed silica. Fumed silica is typically produced by the vapor phase hydrolysis of a silicon compound, e.g., silicon tetrachloride, in a hydrogen oxygen flame. The combustion process creates silicon dioxide molecules that condense to form particles. The particles collide, attach, and sinter together. The result of these processes is typically a three dimensional branched chain aggregate, typically having an average particles size of from about 0.2 to 0.3 micron. Once the aggregates cool below the fusion point of silica (1710° C.), further collisions result in mechanical entanglement of the chains, termed agglomeration.

In one embodiment, suitable fumed silica has a BET surface area of from 50-400 square meters per gram ($m^2/g$), more typically from, from about 100 $m^2/g$ to about 400 $m^2/g$.

In one embodiment, the suspending agent component of the composition of the present invention comprises an inorganic, typically aluminosilicate or magnesium silicate, colloid-forming clay, typically, a smectite (also known as montmorillonoid) clay, an attapulgite (also known as palygorskite) clay, or a mixture thereof. These clay materials can be described as expandable layered clays, wherein the term "expandable" as used herein in reference to such clay relates to the ability of the layered clay structure to be swollen, or expanded, on contact with water.

Smectites are three-layered clays. There are two distinct classes of smectite-type clays. In the first class of smectites, aluminum oxide is present in the silicate crystal lattice and the clays have a typical formula of $Al_2(Si_2O_5)_2(OH)_2$. In the second class of smectites, magnesium oxide is present in the silicate crystal lattice and the clays have a typical formula of $Mg_3(Si_2O_5)(OH)_2$. Furthermore, atomic substitution by iron and magnesium can occur within the crystal lattice of the smectites, while metal cations such as $Na^+$, $Ca^{+2}$, as well as $H^+$, can be present in the water of hydration to provide electrical neutrality. Although the presence of iron in such clay material is preferably avoided to minimize chemical interaction between clay and optional composition components, such cation substitutions in general are immaterial to the use of the clays herein since the desirable physical properties of the clay are not substantially altered thereby.

The layered expandable aluminosilicate smectite clays useful herein are further characterized by a dioctahedral crystal lattice, whereas the expandable magnesium silicate smectite clays have a trioctahedral crystal lattice.

Suitable smectite clays, include, for example, montmorillonite (bentonite), volchonskoite, nontronite, beidellite, hectorite, saponite, sauconite and vermiculite, are commercially available.

Attapulgites are magnesium-rich clays having principles of superposition of tetrahedral and octahedral unit cell elements different from the smectites. An idealized composition of the attapulgite unit cell is given as: $(H_2O)_4(OH)_2 Mg_5Si_8O_{20}4H_2O$. Attapulgite clays are commercially available.

As noted above, the clays employed in the compositions of the present invention contain cationic counter ions such as protons, sodium ions, potassium ions, calcium ions, magnesium ions and the like. It is customary to distinguish between clays on the basis of one cation which is predominately or exclusively absorbed. For example, a sodium clay is one in which the absorbed cation is predominately sodium. Such absorbed cations can become involved in exchange reactions with cations present in aqueous solutions.

Commercially obtained clay materials can comprise mixtures of the various discrete mineral entities. Such mixtures of the minerals are suitable for use in the present compositions. In addition, natural clays sometimes consist of particles in which unit layers of different types of clay minerals are stacked together (interstratification). Such clays are called mixed layer clays, and these materials are also suitable for use herein.

Suitable pesticides are biologically active compounds used to control agricultural pests and include, for example, herbicides, plant growth regulators, crop dessicants, fungicides, bacteriocides, bacteriostats, insecticides, and insect repellants, as well as their water soluble salts and esters. Suitable pesticides include, for example, aryloxyphenoxy-propionate herbicides, such as haloxyfop, cyhalofop, and quizalofop, triazine herbicides such as metribuzin, hexazinone, or atrazine; sulfonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxy carboxylic acid herbicides such as dichlorophenoxyacetic acid ("2,4-D"), dichlorophenoxybutanoic acid ("2,4-DB"), 2-methyl-4-chlorophenoxyacetic acid ("MCPA"), 4-(4-chloro-2-methylphenoxy)butanoic acid ("MCPB"), dichlorprop, and mecoprop, diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; dihalobenzonitrile herbicides such as bromoxynil, or ioxynil, benzoic acid herbicides such as dicamba, dipyridilium herbicides such as paraquat, and pyridine and pyridineoxy carboxylic acid herbicides such as clopyralid, fluroxypyr, picloram, triclopyr, and aminopyralid. Suitable fungicides include, for example, nitrilo oxime fungicides such as cymoxanil; imidazole fungicides such as benomyl, carbendazim, or thiophanate-methyl; triazole fungicides such as triadimefon; sulfenamide fungicides, such as captan; dithio-carbamate fungicides such as maneb, mancozeb, or thiram; chlorinated aromatic fungicides such as chloroneb; dichloro aniline fungicides such as iprodione, strobilurin fungicides such as kresoxim-methyl, trifloxystrobin or azoxystrobin; chlorothalonil; copper salt fungicides such as copper oxychloride; sulfur; phenylamides; and acylamino fungicides such as metalaxyl or mefenoxam. Suitable insecticides, include, for example, carbamate insecticides, such as methomyl, carbaryl, carbofuran, or aldicarb; organo thiophosphate insecticides such as EPN, isofenphos, isoxathion, chlorpyrifos, or chlormephos; organophosphate insecticides such as terbufos, monocrotophos, or terachlorvinphos; perchlorinated organic insecticides such as methoxychlor; synthetic pyrethroid insecticides such as fenvalerate, abamectin or emamectin benzoate, neonicotinoide insecticides such as thiamethoxam or imidacloprid; pyrethroid insecticides such as lambda-cyhalothrin, cypermethrin or bifenthrin, and oxadiazine insecticides such as indoxacarb, imidachlopryd, or fipronil. Suitable miticides include, for example, propynyl sulfite miticides such as propargite; triazapentadiene miticides such as amitraz; chlorinated aromatic miticides such as chlorobenzilate, or tetradifan; and dinitrophenol miticides such as binapacryl. Suitable nematicides include carbamate nematicides, such as oxamyl. It is understood that non-pesticide choline salts excludes any choline salts of the aforementioned pesticides, including in particular, herbicides.

Pesticide compounds are, in general, referred herein to by the names assigned by the International Organization for Standardization (ISO). ISO common names may be cross-referenced to International Union of Pure and Applied Chemistry ("IUPAC") and Chemical Abstracts Service ("CAS") names through a number of sources.

In one embodiment, the pesticide comprises one or more compounds selected from herbicides, plant growth regulators, crop dessicants, fungicides, bacteriocides, bacteriostats, insecticides, miticides, nematocides, insect repellants, and mixtures thereof.

In one embodiment, the pesticide is an herbicide and the pesticide composition is an herbicide composition.

In one embodiment, the herbicide composition comprises one or more herbicide compounds selected from glyphosate, water soluble glyphosate salts, water soluble glyphosate esters, and mixtures thereof, more typically selected from the sodium salt of glyphosate, the potassium salt of glyphosate, the ammonium salt of glyphosate, the dimethyl ammonium salt of glyphosate, the isopropyl amine salt of glyphosate, the trimethyl ammonium salt of glyphosate, and mixtures thereof. It is understood that non-pesticide choline salts excludes any choline salts of the aforementioned herbicides.

In one embodiment, the pesticide composition comprises one or more auxinic herbicides, more typically, one or more auxinic herbicides selected from clopyralid, triclopyr, 2,4-D, 2,4-DB, MCPA, MCPB, dicamba, aminopyralid and picloram, and their respective water soluble salts and esters. It is, however, understood that non-pesticide choline salts excludes any choline salts of the aforementioned herbicides.

In one embodiment, the pesticide comprises one or more herbicide compounds selected from glyphosate, clopyralid, triclopyr, 2,4-D, 2,4-DB, MCPA, MCPB, dicamba, aminopyralid and picloram, their respective water soluble salts and esters, and mixtures thereof, more typically a mixture of water soluble salts of glyphosate and clopyralid, triclopyr, 2,4-D, 2,4-DB, MCPA, MCPB, dicamba, aminopyralid or picloram, even more typically, a mixture of water soluble salts of glyphosate and triclopyr, 2,4-D, or dicamba. In one particular embodiment, the pesticide comprises one or more herbicide compounds, specifically, a mixture of (i) one or more water soluble salts of glyphosate and (ii) one or more water soluble salts of dicamba. It is understood that non-pesticide choline salts excludes any choline salts of the aforementioned pesticides, including in particular, herbicides.

In one embodiment, the pesticide is a mixture comprising glyphosate or a water soluble salt or ester of glyphosate and one or more auxinic herbicides, more typically one or more auxinic herbicides selected from clopyralid, triclopyr, 2,4-D, 2,4-DB, MCPA, MCPB, dicamba, aminopyralid and picloram, and their respective water soluble salts and esters. It is understood that non-pesticide choline salts excludes any choline salts of the aforementioned pesticides, including in particular, auxinic herbicides.

In one embodiment, the concentrated pesticide composition of the present invention comprises, based on 100 pbw of the pesticide composition, from about 1 pbw, more typically from about 30 pbw, and even more typically from about 40 pbw, to about 65 pbw, more typically about 60 pbw, and even more typically about 55 pbw, of the one or more pesticide compounds.

In one embodiment, the composition of the present invention further comprises a surfactant. As used herein the term "surfactant" means a compound that is capable of lowering the surface tension of water, more typically, a compound selected from one of five classes of compounds, that is, cationic surfactants, anionic surfactants, amphoteric surfactants, zwitterionic surfactants, and nonionic surfactants, as well as mixtures thereof.

Suitable cationic surfactants are known in the art, and include, for example, amine salts, such as, ethoxylated tallow amine, cocoalkylamine, and oleylamine, quaternary ammonium compounds such as cetyl trimethyl ammonium bromide, myristyl trimethyl ammonium bromide, stearyl dimethyl benzyl ammonium chloride, lauryl/myristryl trimethyl ammonium methosulfate, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, cocoyl hydroxyethylimidazolinium, and mixtures thereof.

In some embodiments, the composition further comprise a suitable water soluble non-surfactant salts, which include organic non-surfactant salts, inorganic non-surfactant salts, and mixtures thereof, as well as polyelectrolytes, such as uncapped polyacrylates, polymaleates, or polycarboxylates, lignin sulfonates or naphthalene sulfonate formaldehyde copolymers. The water soluble non-surfactant salt comprises a cationic component and an anionic component. Suitable cations may be monovalent or multivalent, may be organic or inorganic, and include, for example, sodium, potassium, lithium, calcium, magnesium, cesium, and lithium cations, as well as mono-, di- tri- or quaternary pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, carboxylate, phosphate, and phosphonate anions. Suitable water soluble non-surfactant salts include, for example, non-surfactant salts of multivalent anions with monovalent cations, such as potassium pyrophosphate, potassium tripolyphosphate, and sodium citrate, non-surfactant salts of multivalent cations with monovalent anions, such as calcium chloride, calcium bromide, zinc halides, barium chloride, and calcium nitrate, and non-surfactant salts of monovalent cations with monovalent anions, such as sodium chloride, potassium chloride, potassium iodide, sodium bromide, alkali metal nitrates.

In one embodiment, the composition of the present invention does not contain any cationic surfactant, anionic surfactant, amphoteric surfactant, zwitterionic surfactant that is a water soluble salt.

In one embodiment, the composition of the present invention further comprises a cationic surfactant, anionic surfactant, amphoteric surfactant, or zwitterionic surfactant, such as, for example, sodium lauryl sulfate, that is a water soluble salt. The amount of surfactant that is a water soluble salt is to be included in the total amount of water soluble salt for purposes of determining the total amount of water soluble salt component of the composition of the present invention.

As discussed, below, in one embodiment, the composition is a concentrated, dilutable form of an end use composition and further comprises one or more active ingredients, such as, for example, a personal care benefit agent, a pesticidal active ingredient, or a pharmaceutical active ingredient, appropriate to the intended end use. Such active ingredients may be water soluble non-surfactant salts. The amount of active ingredient that is a water soluble non-surfactant salt is to be included in the total amount of water soluble for purposes of determining the total amount of water soluble salt component of the composition of the present invention.

The composition of the present invention is typically made by mixing the components of the composition together.

In another embodiment, wherein the liquid medium is an aqueous medium comprising water and a water immiscible organic liquid, the composition is typically made by:

mixing, optionally, all or a portion of the emulsifier, and optionally, a suspending agent, with the water, mixing the polysaccharide, optionally all or a portion of the emulsifier, and optionally, a suspending agent, with the water immiscible organic liquid, and combining the water-based mixture and the water immiscible organic liquid-based mixture to form the composition. The emulsifier may be added to either the water mixture or the water immiscible organic liquid mixture, or a portion of the emulsifier may be added to each of the mixtures. If the optional suspending agent is used, all of the suspending agent may all be added to the water, all of the suspending agent may be added to the water immiscible organic liquid, or a first portion of the suspending agent may be added to the water and a second portion of the suspending agent added to the water immiscible organic liquid. Any optional hydration inhibitor component that may be used in addition to the water immiscible organic liquid may be added to either the water or the water immiscible organic liquid. This manner of addition avoids hydration of the polysaccharide and avoids the risk formation of an intermediate composition having an intractably high viscosity.

In one embodiment, the composition of the present invention exhibits dilution thickening behavior, that is, as the composition of the present invention is diluted with water, the viscosity of the viscosity of the composition initially increases with increasing dilution, reaches a maximum value and then decreases with further dilution. The increasing viscosity with increasing dilution corresponds to an increasing concentration of dissolved water soluble polysaccharide as the concentration of the surfactant and or salt component of the composition decreases with increasing dilution.

In one embodiment, the composition of the present invention is useful as a pumpable liquid source of polysaccharide with a high polysaccharide content for formulating aqueous end use compositions, in particular agricultural pesticide compositions.

In one embodiment, the composition of the present invention is an agricultural pesticide adjuvant composition that stable, has a low viscosity, is easily transportable, is pourable and pumpable under field conditions, and is dilutable with water under agricultural field conditions.

In one embodiment, the composition of the present invention is mixed with a pesticide active ingredient and, optionally other adjuvant ingredients, and water to form a dilute pesticide composition for spray application to target pests.

In one embodiment, the concentrate is diluted to form an end use composition, the end use composition is contacted with a target substrate, such as plant foliage, and the polysaccharide component of the concentrate enhances delivery of the active ingredient onto the substrate.

Two formulation compositions exist with varying guar levels to give a more concentrated version to be used at a lower use rate.

Experiments:

A greenhouse study was conducted to evaluate efficacy benefits of several candidates.

Procedure: Product application was made using a DeVries spray booth calibrated to 10 gpa, 40 psi with flat-fan AIXR11002 nozzle. Test plants were placed in a certain zone (Zone 3) of research greenhouse on a wire-mesh raised bench and arranged in a randomized complete block design. Research greenhouse is monitored by Procom, Micro Grow Greenhouse System temperature control system. Environmental conditions averaged high temperature 87° F. to low temperature of 75° F. during trial dates. Average humidity levels ranged from 40% to 90%. Test plants received natural lighting for duration of trial. Test plants were soil watered every twenty-four (24) hours as needed.

Weeds were evaluated for percent control at 3, 7, 14, and 21-days following application. Crops were evaluated for percent injury at 3, 7, 14, and 21-days following application.

Rating scale used; 0 indicating no control/injury up to 100 indicating complete control of weed species as compared to the untreated check. Necrosis, leaf burn, and stunting were observed at ratings.

Table I shows average efficacy benefits of several treatments after 21 days.

| Treatment | Water hardness | Use rate (% w/w) | Velvet leaf | Common barnyardgrass | Yellow foxtail | Ivyleaf morning glory | Average |
|---|---|---|---|---|---|---|---|
| Roundup Powermax ® DI water 1.5 wt % | DI water | | 15 | 76.7 | 40 | 20 | 37.925 |
| Roundup ® Powermax 1000 ppm HW (control) | 1000 ppm water | 7.25 | 15 | 23.3 | 36.7 | 30 | 26.25 |
| Ammonium Sulfate 1% | 1000 ppm water | 2.5 | 18.3 | 80 | 40 | 20 | 39.575 |
| Ammonium Sulfate 2% | 1000 ppm water | 5 | 18.3 | 90 | 40 | 18.3 | 41.65 |
| Choline bicarbonate (80% liquid) 1% | 1000 ppm water | 1 | 15 | 30 | 83.3 | 10 | 34.575 |
| Citric acid (55% soln) 0.18% | 1000 ppm water | 0.18 | 15 | 83.3 | 36.7 | 16.7 | 37.925 |
| Citric acid (55% soln) 0.45% | 1000 ppm water | 0.45 | 15 | 60 | 50 | 20 | 36.25 |
| Choline Dihydrogen Citrate 0.4% | 1000 ppm water | 0.4 | 20 | 83.3 | 40 | 26.7 | 42.5 |

What is claimed is:

1. An agricultural composition comprising:
   a non-pesticide water conditioning component, wherein the non-pesticide water conditioning component comprises choline salt comprising at least one of the following: choline carbonate, choline sulfate, choline citrate, choline acrylates, choline carboxylates, choline phosphonates, tricholine citrate, tricholine phosphate, choline dihydrogen citrate, or choline bitartrate, wherein the non-pesticide water conditioning component is between 0.4 wt. % and 1 wt. % of the composition based on the total weight of the composition; and at least one pesticide comprising dicamba or a salt thereof, wherein the dicamba or salt thereof is between 0.005 wt. % and 1 wt. % of the composition based on the total weight of the composition; and optionally, water.

2. The agricultural composition of claim 1, further comprising a surfactant.

3. The agricultural composition of claim 1, wherein the pesticide is a combination of:
   (i) dicamba or a salt thereof; and
   (ii) glyphosate or a salt thereof.

4. The agricultural composition of claim 1, wherein the agricultural composition comprises less than about 1 wt. % of ammonium-containing compounds based on the total weight of the composition.

5. An agricultural composition effective at controlling plant pests or controlling plant growth in combination with a pesticidally effective amount of a pesticide comprising:
   a water conditioning component comprising choline salt comprising at least one of the following: choline bicarbonate, choline carbonate, choline sulfate, choline citrate, choline acrylates, choline carboxylates, choline phosphonates, tricholine citrate, tricholine phosphate, choline dihydrogen citrate or choline bitartrate, wherein the water conditioning component is at least 5 wt. % and up to and including 90 wt. % of the composition based on the total weight of the composition; and
   a drift reduction agent comprising at least one polysaccharide, at least one derivatized polysaccharide or a combination thereof, wherein the drift reduction agent is present in an amount from 0.01 wt % to about 15 wt % by weight of the composition based on the total weight of the composition; and
   a dispersant or surfactant, wherein the dispersant or surfactant is present in an amount from about 0.01 wt % to about 50 wt % by weight of the composition based on the total weight of the composition; and
   optionally, water,
   wherein the at least one derivatized polysaccharide is hydroxypropyl guar, carboxymethylhydroxypropyl guar; carboxymethyl guar, hydroxypropyl trimethylammonium guar, trimethylammonium guar, hydroxypropyl lauryldimethylammonium guar or hydroxypropyl stearyldimethylammonium guar.

6. The agricultural composition of claim 5, wherein the at least one derivatized polysaccharide is hydroxypropyl guar or carboxymethylhydroxypropyl guar.

7. The agricultural composition of claim 5, wherein the at least one derivatized polysaccharide is hydroxypropyl guar, carboxymethyl guar, hydroxypropyl trimethylammonium guar, trimethylammonium guar, hydroxypropyl lauryldimethylammonium guar or hydroxypropyl stearyldimethylammonium guar.

8. The agricultural composition of claim 5, wherein the dispersant is a salt of polycarboxylic acid.

9. The agricultural composition of claim 5, wherein the water conditioning component is present in an amount from about 10 wt % to about 50 wt %, by weight of the composition.

10. The agricultural composition of claim 5, wherein the water conditioning component is present in an amount from about 20 wt % to about 40 wt %, by weight of the composition.

11. The agricultural composition of claim 5, wherein the composition is free or substantially free of ammonium-containing compounds.

12. A method for preparing a pesticide composition comprising the steps of:
   contacting the agricultural composition of claim 5 with a pesticide comprising dicamba or a salt thereof to form a pesticide formulation.

13. The method of claim 12, wherein the one derivatized polysaccharide is cationic hydroxypropyl guar or cationic guar.

14. The agricultural composition of claim 5, wherein the agricultural composition comprises less than about 1 wt. % of ammonium-containing compounds based on the total weight of the composition.

15. The agricultural composition of claim 5, further comprising a water-soluble nitrogen-containing fertilizer.

16. The agricultural composition of claim 5, further comprising a pesticide.

17. The agricultural composition of claim 5, wherein the choline salt is at least one of the following: choline bicarbonate, choline carbonate, choline sulfate, choline citrate, choline acrylates, choline carboxylates, choline phosphonates, tricholine citrate, tricholine phosphate, or choline dihydrogen citrate.

18. The agricultural composition of claim 17, wherein the at least one derivatized polysaccharide is hydroxypropyl guar or carboxymethylhydroxypropyl guar.

19. The agricultural composition of claim 17, wherein the at least one derivatized polysaccharide is hydroxypropyl guar, carboxymethyl guar, hydroxypropyl trimethylammonium guar, trimethylammonium guar, hydroxypropyl lauryldimethylammonium guar or hydroxypropyl stearyldimethylammonium guar.

20. The agricultural composition of claim 1, wherein the non-pesticide water conditioning component is between 0.5 wt. % and 1 wt. % of the composition based on the total weight of the composition.

* * * * *